United States Patent
Halloran et al.

[11] Patent Number: 5,707,434
[45] Date of Patent: Jan. 13, 1998

[54] WATER SOLUBLE AMMONIUM SILOXANE COMPOSITIONS AND THEIR USE AS FIBER TREATMENT AGENTS

[75] Inventors: Daniel Joseph Halloran; Dawn Marie Hoffman, both of Midland, Mich.

[73] Assignee: Dow Corning Corporation, Midland, Mich.

[21] Appl. No.: 730,982

[22] Filed: Oct. 16, 1996

[51] Int. Cl.$^6$ ........................................ C09D 5/00
[52] U.S. Cl. ........................ 106/287.11; 252/8.63; 423/387
[58] Field of Search .............. 106/287.11; 252/8.63; 423/387

[56] References Cited

U.S. PATENT DOCUMENTS

| | | | |
|---|---|---|---|
| 2,947,771 | 8/1960 | Bailey | 260/448.2 |
| 3,335,424 | 8/1967 | Brown | 260/46.5 |
| 3,544,498 | 12/1970 | Holdstock et al. | 260/29.2 |
| 3,576,779 | 4/1971 | Holdstock et al. | 260/29.2 |
| 3,890,269 | 6/1975 | Martin | 260/46.5 |
| 4,472,566 | 9/1984 | Ziemelis | 528/38 |
| 4,597,964 | 7/1986 | Ziemelis et al. | 424/70 |
| 4,602,959 | 7/1986 | Kurita et al. | 106/287.11 |
| 4,631,207 | 12/1986 | Price | 106/287.11 |
| 4,680,366 | 7/1987 | Tanaka et al. | 106/287.11 |
| 4,891,166 | 1/1990 | Schaefer et al. | 260/404.5 |
| 4,895,964 | 1/1990 | Margida | 556/425 |
| 4,973,620 | 11/1990 | Ona et al. | 106/287.11 |
| 5,026,489 | 6/1991 | Snow et al. | 252/8.8 |
| 5,041,590 | 8/1991 | Snow | 556/425 |
| 5,087,715 | 2/1992 | Snow | 556/413 |
| 5,098,979 | 3/1992 | O'Lenick, Jr. | 528/15 |
| 5,104,576 | 4/1992 | Snow | 252/357 |
| 5,110,891 | 5/1992 | Cifuentes et al. | 528/34 |
| 5,115,049 | 5/1992 | Imperante et al. | 525/479 |
| 5,235,082 | 8/1993 | Hill et al. | 556/425 |
| 5,364,633 | 11/1994 | Hill et al. | 424/450 |
| 5,403,886 | 4/1995 | Chrobaczek et al. | 106/287.11 |

*Primary Examiner*—David Brunsman
*Attorney, Agent, or Firm*—Timothy J. Troy

[57] ABSTRACT

The present invention relates to a water soluble ammonium siloxane composition comprising (A) an aminosiloxane solution comprising a mixture of (i) a triorganosilyl-endblocked aminofunctional siloxane, (ii) an aminofunctional siloxane which it triorganosiloxy-endblocked at one end and hydroxy-endblocked at the other end, and (iii) a hydroxy-endblocked aminofunctional siloxane, (B) a cyclic aminofunctional siloxane, and (C) a polydimethylcyclosiloxane where the aminofunctional group is selected from $-R^3-{}^+NHR^5-R^4-{}^+NH_2R^5.2A^-$, $-R^3-{}^+NH_2-R^4-{}^+NHR^6.A^-$, $-R^3-NR^6-R^4-{}^+NH_3.A^-$, $-R^3-{}^+NH_2R^5.A^-$, where $R^3$ is a divalent hydrocarbon radical, $R^4$ is a divalent hydrocarbon radical, $R^5$ is hydrogen, alkyl, aryl, or arylalkyl, $R^6$ is a $-C(O)R^7$ group where $R^7$ is a monovalent hydrocarbon group or aryl, and $A^-$ is a halide anion, carboxylate anion, or inorganic oxoanion. This invention further relates to a method of making the water soluble ammonium siloxane composition, and to a method of treating a substrate with the water soluble ammonium siloxane composition.

30 Claims, No Drawings

WATER SOLUBLE AMMONIUM SILOXANE COMPOSITIONS AND THEIR USE AS FIBER TREATMENT AGENTS

BACKGROUND OF THE INVENTION

The present invention relates to ammonium siloxane compositions. More particularly, the present invention relates to water soluble ammonium siloxane compositions, a method of making water soluble ammonium siloxane compositions, and the use of these compositions as fiber treatment agents.

Quaternary ammonium polydiorganosiloxanes which are cationic and water soluble have been disclosed. For example, Schaefer et al. in U.S. Pat. No. 4,891,166 discloses diquaternary polysiloxanes whose quaternary nitrogen groups are terminally linked to the polysiloxane molecule, and their use in cosmetic preparations, especially in preparations for the care of hair. Margida in U.S. Pat. No. 4,895,964 discloses a process for the manufacture of quaternary ammonium pendant siloxane copolymers by the reaction of epoxy pendant siloxane copolymers with a tertiary amine acid salt using a catalytic amount of a free tertiary amine as the catalyst. Snow in U.S. Pat. No. 5,041,590 discloses a quaternary ammonium functional siloxane compound having the formula $[(R_3SiO)_2—SiR—(CH_2)_a]_b N^+R'_{4-b}X^-$ where R is an alkyl radical having one to six carbon atoms, R' is an alkyl or aryl radical having one to eight carbon atoms, X is a chloride, bromide, iodide, nitrate, or $RSO_4^-$, a is an integer having a value from 1 to 10, and b is an integer having a value of 2 or 3. Snow further discloses that these siloxane compounds are useful in reducing the surface tension of an aqueous solution. Hill et al. in U.S. Pat. No. 5,235,082 discloses diquaternary ammonium functional siloxanes which have a variable amount of hydrophobicity at the center of the molecule which makes them useful in the field of fabric softening and fabric conditioning. Hill et al. in U.S. Pat. No. 5,364,633 discloses a method of entrapping a water-soluble substance in vesicles formed from a siloxane surfactant, where suitable siloxane surfactants include organosilicon compounds having the formula $RMe_2SiO(Me_2SiO)_a(MeRSiO)_bSiMe_2R$, $Me_3SiO(Me_2SiO)_a(MeRSiO)_bSiMe_3$, or $Me_3SiO(MeRSiO)SiMe_3$ where R can be a $—(CH_2)_xN^+R_3"A^-$, R" is an alkyl radical having from 1 to 6 carbon atoms, a benzyl radical, a phenyl radical, or the radical $—CH_2CH_2OH$, $A^-$ is chloride, bromide, iodide, cyanide, a methyl sulfate radical, a salicylate radical, or a dodecylsulfate radical, a has a value of 0 to 200, and b has a value of 0 to 50 with the proviso that both a and b cannot both be zero. O'Lenick Jr. in U.S. Pat. No. 5,098,979 discloses silicone polymers which contain a quaternary nitrogen pendant group, where in one embodiment the quaternary nitrogen group has an alkylamido functionality and in a second embodiment it contains an imidazoline derived functionality. O'Lenick Jr. further discloses that these polymers are useful in softening hair, textile fibers, and conditioning skin.

In addition, other low molecular weight aminofunctional siloxanes are known to be water-soluble. For example, Snow in U.S. Pat. Nos. 5,087,715 and 5,104,576 discloses alkanolaminofunctional siloxanes which are useful in altering the surface activity of water, the siloxanes having the formula $R^1_3SiO(R^1MSiO)_ySiR^1_3$ or $R^1_3SiO(R^1_2SiO)_x(R^1MSiO)_ySiR^1_3$ where x is an integer from 1 to 100, y is an integer from 1 to 10, $R^1$ is a lower alkyl group, and M is an alkanolamino group having the formula $—(CH_2)_aN(R^2)—(CH_2)_bOR^3$ or $—(CH_2)_aN+(R^2)(R^4)—(CH_2)_bOR^3Z^-$ where a is an integer from 1 to 10, b is an integer from 1 to 10, $R^2$ is hydrogen, a $C_1$ to $C_{18}$ alkyl group, a $C_6$ to $C_{18}$ aryl group, $—CH_2—C_6H_5$, or a $C_5$ to $C_{18}$ cycloalkyl group, $R^3$ is hydrogen, a $C_1$ to $C_{18}$ alkyl group, a $C_6$ to $C_{18}$ aryl group, a $C_5$ to $C_{18}$ cycloalkyl group, $—C(O)R^5$, $—C(O)NHR^6$, $—SO_3^-$, $—Si(CH_3)_3$, or $—P(O)(OCH_3)_2$, $R^4$ is hydrogen, a $C_1$ to $C_{18}$ alkyl group, a $C_6$ to $C_{18}$ aryl group, $—CH_2—C_6H_5$, or a $C_5$ to $C_{18}$ cycloalkyl group, $R^5$ and $R^6$ are a $C_1$ to $C_{18}$ alkyl group, a $C_6$ to $C_{18}$ aryl group, or a $C_5$ to $C_{18}$ cycloalkyl group, and Z is Cl, Br, I, $NO_3$, a $C_1$ to $C_8$ alkylsulfate group, $—CH_3COO^-$, $BF_4^-$ or $PF_6^-$. Snow et al. in U.S. Pat. No. 5,026,489 discloses a fabric softening composition which includes an alkanolamino functional silicone compound having the formula $(R_3SiO)_2SiR—(CHR')_aN^+R'_bR"_{3-b}X^-$ where R is an alkyl radical having one to six carbon atoms, R' is hydrogen, alkyl and aryl radicals having one to eighteen carbon atoms, R" is (CHR') OH, X is a chloride, bromide, iodide, nitrate, or $RSO_4^-$, a is an integer having a value from 1 to 10, and b is an integer having a value of 1 or 2.

Polymeric ammonium functional siloxanes have also been taught. For example, Ziemelis et al. in U.S. Pat. Nos. 4,472,566 and 4,597,964 discloses cationic polydiorganosiloxanes having the general formula $QMe_2SiO(Me_2SiO)_x(MeRSiO)_ySiMe_2Q$ where Me denotes methyl, and R is a radical having the formula

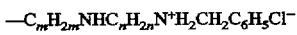

or

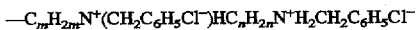

where m has a value of 2 to 5 inclusive, and n has a value of 1 to 5 inclusive, Q is R, methyl, or OH, x has a value of 5 to 200, and y has a value of 1 to 30. Ziemelis et al. further discloses that these siloxanes are useful for treating human hair, human skin, and animal fur.

Reactive ammonium-functional siloxanes have also been disclosed in the art. For example, Brown in U.S. Pat. No. 3,355,424 discloses a process for the preparation of polyaminoalkyl-substituted organosiloxane copolymers and salts thereof, and to the reaction products of said processes. Holdstock et al. in U.S. Pat. Nos. 3,544,498 and 3,576,779 discloses an organopolysiloxane copolymer which is prepared by the partial hydrolysis and condensation of a silanol-chainstopped polydimethylsiloxane having 5 siloxy units, an aminoalkyltrialkoxysilane, and an aminoalkoxyalkyltrialkoxysilane. Holdstock et al. further teaches that a second organopolysiloxane copolymer can be prepared by the partial hydrolysis and condensation of a silanol-chainstopped polydimethylsiloxane having 800 dimethylsiloxy units with an aminoalkoxyalkenyltrialkoxysilane. Holdstock et al. further teaches that the first organopolysiloxane polymer can be converted to a partial amine salt by reaction with an aliphatic carboxylic acid, then mixed with the second organopolysiloxane. Martin in U.S. Pat. No. 3,890,269 discloses a process for preparing aminofunctional organopolysiloxanes which comprises equilibrating a mixture containing an organopolysiloxane and an aminofunctional silane or siloxane in the presence of a catalyst. Martin further discloses that the aminofunctional groups present in the organopolysiloxanes which are prepared can be reacted with organic or inorganic acids to form the corresponding ammonium salts. Cifuentes et al. in U.S. Pat. No. 5,110,891 teaches a polish formulation which contains a reactive amine functional silicone polymer.

Furthermore, other water-insoluble ammonium siloxanes which result from the reaction of amino-siloxanes and organic carboxylic acids have been taught. For example, Imperante et al. in U.S. Pat. No. 5,115,049 discloses fatty carboxylic acid salts of organofunctional silicone amines where the amino pendant functionality is present within the polymer.

Unreactive linear amino-siloxanes have also been described. For example, Bailey in U.S. Pat. No. 2,947,771 discloses the production of endblocked organopolysiloxanes containing among other siloxane units, aminoalkylalkylsiloxane or aminoalkylarylsiloxane units in which the amino group is linked to the silicon atoms through a polymethylene chain of at least three carbon atoms.

SUMMARY OF THE INVENTION

The present invention relates to water soluble ammonium siloxane compositions, a method of making water soluble ammonium siloxane compositions, and the use of these compositions as fiber treatment agents.

It is an object of the present invention to produce novel linear silicone-unreactive water-soluble ammonium functional siloxane compositions.

It is a further object of this invention to produce water-soluble ammonium functional siloxane compositions which are useful as fiber treatment agents.

It is another object of this invention to prepare ammonium functional siloxane compositions which, when applied to fibers such as paper pulp or tissue, render the fibers soft and smooth to the touch.

It is another object of this invention to produce water-soluble ammonium functional siloxane compositions which have at least 10 mole percent ammonium-methylsiloxane functionality.

DETAILED DESCRIPTION OF THE INVENTION

The present invention relates, in a first embodiment, to a water soluble ammonium siloxane composition comprising (A) 0.01 to 90 weight percent of an aminosiloxane blend comprising a mixture of (i) an aminofunctional siloxane having its formula selected from the group consisting of (a) $R_3SiO(Me_2SiO)_x(RR^1SiO)_y(RR^2SiO)_zSiR_3$ and (b) $R_3SiO(Me_2SiO)_x(RR^1SiO)_ySiR_3$, and (ii) an aminofunctional siloxane having its formula selected from the group consisting of (a) $R_3SiO(Me_2SiO)_x(RR^1SiO)_y(RR^2SiO)_zSiR_2OH$ and
(b) $R_3SiO(Me_2SiO)_x(RR^1SiO)_ySiR_2OH$, and (iii) an aminofunctional siloxane having its formula selected from the group consisting of (a) $HOR_2SiO(Me_2SiO)_x(RR^1SiO)_y(RR^2SiO)_zSiR_2OH$ and
(b) $HOR_2SiO(Me_2SiO)_x(RR^1SiO)_ySiR_2OH$, (B) 0.1 to 90 weight percent of a cyclic aminofunctional siloxane having the formula

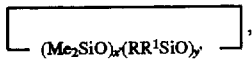
(i)

and
(C) 0.1 to 10 weight percent of a compound having the formula:

(i)

wherein Me denotes methyl, R is independently a monovalent hydrocarbon radical having from 1 to 6 carbon atoms or an aryl radical, $R^1$ is a group having its formula selected from the group consisting of $-R^3-{}^+NHR^5-R^4-{}^+NH_2R^5.2A^-$, $-R^3-{}^+NH_2-R^4-NHR^6.A^-$, $-R^3-NR^6-R^4-{}^+NH_3.A^-$, $-R^3-{}^+NH_2R^5.A^-$, and wherein $R^3$ is a divalent hydrocarbon radical having at least 3 carbon atoms, $R^4$ is a divalent hydrocarbon radical having at least 2 carbon atoms, $R^5$ is selected from the group consisting of hydrogen, an alkyl radical having from 1 to 6 carbon atoms, an aryl radical, and an arylalkyl radical, $R^6$ is a $-C(O)R^7$ group where $R^7$ is selected from the group consisting of a monovalent hydrocarbon group having from 1 to 20 carbon atoms and an aryl radical, and $A^-$ is an anion selected from the group consisting of halide anions, carboxylate anions, and inorganic oxoanions, $R^2$ is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1.

The monovalent hydrocarbon radicals of R are exemplified by alkyl radicals such as methyl, ethyl, propyl, pentyl, or hexyl, and the aryl radicals are exemplified by phenyl, tolyl, or xylyl. In the compositions of this invention R is preferably methyl or phenyl. The monovalent hydrocarbon radicals of $R^2$ are exemplified by ethyl, propyl, butyl, pentyl, or hexyl and the aryl radicals are as defined above for R. Preferably $R^2$ is independently selected from the group consisting of ethyl, propyl, butyl, hexyl, phenyl, tolyl, and xylyl.

In the compositions of this invention, the divalent hydrocarbon radicals of $R^3$ are exemplified by groups such as alkylene groups including propylene, butylene, pentylene, trimethylene, 2-methyltrimethylene, pentamethylene, hexamethylene, 3-ethyl-hexamethylene, octamethylene, $-CH_2(CH_3)CH-$, $-CH_2CH(CH_3)CH_2-$, $-(CH_2)_{18}-$, and cycloalkylene radicals such as cyclohexylene, arylene radicals such as phenylene, combinations of divalent hydrocarbon radicals such as benzylene ($-C_6H_4CH_2-$), and oxygen containing groups such as $-CH_2OCH_2-$, $-CH_2CH_2CH_2OCH_2-$, $-CH_2CH_2OCH_2CH_2-$, $-COOCH_2CH_2OOC-$, $-CH_2CH_2OCH(CH_3)CH_2-$, and $-CH_2OCH_2CH_2OCH_2CH_2-$. Preferably $R^3$ is selected from the group consisting of propylene, butylene, pentylene, trimethylene, 2-methyltrimethylene, pentamethylene, hexamethylene, 3-ethyl-hexamethylene, and octamethylene.

In the compositions of this invention, the divalent hydrocarbon radicals of $R^4$ are exemplified by ethylene or any of the divalent hydrocarbon radicals delineated for $R^3$ hereinabove. Preferably $R^4$ is selected from the group consisting of ethylene, propylene, butylene, pentylene, trimethylene, 2-methyltrimethylene, pentamethylene, hexamethylene, 3-ethyl-hexamethylene, and octamethylene.

In the compositions of this invention, the alkyl radicals and aryl radicals of $R^5$ are as delineated for R hereinabove. The arylalkyl radicals of $R^5$ are exemplified by benzyl and 2-phenylethyl. It is preferred that $R^5$ is selected from the group consisting of hydrogen, methyl, phenyl, and benzyl.

The group $R^6$ is a

group where $R^7$ is a monovalent hydrocarbon group having from 1 to 20 carbon atoms or an aryl radical. The monovalent hydrocarbon groups of $R^7$ are exemplified by methyl, ethyl, propyl, —$C_6H_5$, and a group having the formula —$(CH_2)_nCH_3$ where n has a value of 4 to 18.

In the compositions of this invention, the halide anions of $A^-$ are exemplified by $Cl^-$, $Br^-$, $I^-$, and $F^-$, the carboxylate anions of $A^-$ are exemplified by $CH_3COO^-$, $HOCH_2COO^-$, $C_6H_5COO^-$, $HOC_6H_4COO^-$, $CH_3CH_2COO^-$, $CH_3CH_2CH_2COO^-$, $CH_3CH(OH)CH_2COO^-$, $CH_3(CH_2)_4COO^-$, $CH_3(CH_2)_3CH(OH)COO^-$, $CH_3(CH_2)_6COO^-$, $CH_3(CH_2)_8COO^-$, $HO(CH_2)_9COO^-$, $CH_3(CH_2)_{10}COO^-$, $HO(CH_2)_{11}COO^-$, $CH_3(CH_2)_{14}COO^-$, $HO(CH_2)_{15}COO^-$, $CH_3(CH_2)_{16}COO^-$, $CH_3(CH_2)_5CH(OH)(CH_2)_{10}COO^-$, and $ClC_6H_4COO^-$, and the inorganic oxoanions are exemplified by $ClO^-$, $ClO_3^-$, $ClO_2^-$, $ClO_4^-$, $SO_4^=$, $PO_4^{\equiv}$, $HCO_2^-$, $NO_3^-$, $CO_3^=$, and $HCO_3^-$.

Preferably, (A)(i) is an aminofunctional siloxane having the formula $Me_3SiO(Me_2SiO)_x(MeR^1SiO)_ySiMe_3$, (A)(ii) is an aminofunctional siloxane having the formula $Me_3SiO(Me_2SiO)_x(MeR^1SiO)_ySiMe_2OH$, (A)(iii) is an aminofunctional siloxane having the formula $HOMe_2SiO(Me_2SiO)_x(MeR^1SiO)_ySiMe_2OH$, and (B) is a cyclic aminofunctional siloxane having the average formula:

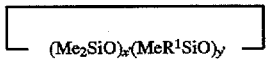

wherein $R^1$ is a group having its formula selected from the group consisting of:

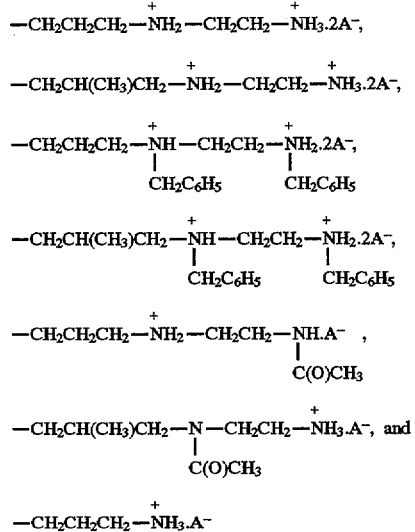

wherein $A^-$ is selected from the group consisting of $CH_3COO^-$, $Cl^-$, $HOCH_2COO^-$, $C_6H_5COO^-$, and $HOC_6H_4COO^-$ wherein x, y, x', and y' are as defined above.

It is also preferred that in the compositions of the invention, x has a value of 10 to 100, y has a value of 5 to 50, x' has a value of 2 to 3.5, and y' has a value of 0.5 to 2 with the proviso that the value of x'+y' is 4.

The compositions of the present invention comprise 0.01 to 90 weight percent of component (A), 0.1 to 90 weight percent of component (B), and 0.1 to 10 weight percent of component (C) such that the combined weight percent of components (A)+(B)+(C) is 100 weight percent.

In a second embodiment, the present invention relates to a method of making a water soluble ammonium siloxane composition comprising mixing (I) a blend comprising (A) 0.01 to 90 weight percent of an aminosiloxane solution comprising a mixture of (i) an aminofunctional siloxane having its formula selected from the group consisting of
(a) $R_3SiO(Me_2SiO)_x(RR^1SiO)_y(RR^2SiO)_zSiR_3$ and
(b) $R_3SiO(Me_2SiO)_x(RR^1SiO)_ySiR_3$, and (ii) an aminofunctional siloxane having its formula selected from the group consisting of
(a) $R_3SiO(Me_2SiO)_x(RR^1SiO)_y(RR^2SiO)_zSiR_2OH$ and
(b) $R_3SiO(Me_2SiO)_x(RR^1SiO)_ySiR_2OH$, and (iii) an aminofunctional siloxane having its formula selected from the group consisting of
(a) $HOR_2SiO(Me_2SiO)_x(RR^1SiO)_y(RR^2SiO)_zSiR_2OH$ and
(b) $HOR_2SiO(Me_2SiO)_x(RR^1SiO)_ySiR_2OH$, (B) 0.1 to 90 weight percent of a cyclic aminofunctional siloxane having the average formula

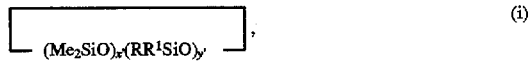

and (C) 0.1 to 10 weight percent of a compound having the average formula:

wherein Me denotes methyl, R is independently a monovalent hydrocarbon radical having from 1 to 6 carbon atoms or an aryl radical, $R^1$ is a group having its formula selected from the group consisting of —$R^3NH$—$R^4$—$NH_2$ and —$R^3$—$NH_2$ wherein $R^3$ is a divalent hydrocarbon radical having at least 3 carbon atoms, $R^4$ is a divalent hydrocarbon radical having at least 2 carbon atoms, $R^2$ is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1; (II) an acid compound; and (III) water.

In the above method, the monovalent hydrocarbon radicals and aryl radicals of R are as described hereinabove. Preferably R is methyl or phenyl. The monovalent hydrocarbon radicals and aryl radicals of $R^2$ are as described hereinabove. Preferably $R^2$ is independently selected from the group consisting of ethyl, propyl, butyl hexyl, phenyl, tolyl, and xylyl.

The divalent hydrocarbon radicals of $R^3$ are as described hereinabove. Preferably $R^3$ is selected from the group consisting of propylene, butylene, pentylene, trimethylene, 2-methyltrimethylene, pentamethylene, hexamethylene, 3-ethyl-hexamethylene, and octamethylene.

The divalent hydrocarbon radicals of $R^4$ are as described hereinabove. Preferably $R^4$ is selected from the group consisting of ethylene, propylene, butylene, pentylene, trimethylene, 2-methyltrimethylene, pentamethylene, hexamethylene, 3-ethyl-hexamethylene, and octamethylene.

In this method of the invention it is preferred that (A)(i) is an aminofunctional siloxane having the formula $Me_3SiO(Me_2SiO)_x(MeR^1SiO)_ySiMe_3$, (A)(ii) is an aminofunctional siloxane having the formula $Me_3SiO(Me_2SiO)_x(MeR^1SiO)_y$ SiMe$_2$OH, (A)(iii) is an aminofunctional siloxane having the formula HOMe$_2$SiO(Me$_2$SiO)$_x$(MeR$^1$SiO)$_y$SiMe$_2$OH, and (B) is a cyclic aminofunctional siloxane having the formula:

(Me$_2$SiO)$_{x'}$(MeR$^1$SiO)$_{y'}$ wherein R$^1$ is a group having its formula selected from the group consisting of —CH$_2$CH$_2$CH$_2$—NH—CH$_2$CH$_2$—NH$_2$, —CH$_2$CH(CH$_3$)CH$_2$—NH—CH$_2$CH$_2$—NH$_2$, and —CH$_2$CH$_2$CH$_2$—NH$_2$ wherein x, y, x', and y' are as defined above.

It is preferred in this method of the invention that x has a value of 10 to 100, y has a value of 5 to 50, x' has a value of 2 to 3.5, and y' has a value of 0.5 to 2 with the proviso that the value of x'+y' is 4.

In the method of the present invention there is present in component (I), 0.01 to 90 weight percent of component (A), 0.1 to 90 weight percent of component (B), and 0.1 to 10 weight percent of component (C) such that the combined weight percent of components (A)+(B)+(C) is 100 weight percent.

It is preferred for purposes of this invention that from 0.01 to 90 weight percent of Component (I) is used, and it is highly preferred that from 0.1 to 90 weight percent of Component (I) be employed.

The acid compound of component (II) in this method of the invention can be an inorganic acid or an organic acid and can be a strong acid or a weak acid. Preferably the acid is a mineral acid or a carboxylic acid. The carboxylic acid can be for example, an aliphatic carboxylic acid exemplified by acetic acid and formic acid, or an aromatic carboxylic acid exemplified by benzoic acid or salicylic acid. Acids suitable as component (II) include CH$_3$COOH (acetic acid), HCOOH (formic acid), HOCH$_2$COOH (glycolic acid), C$_6$H$_5$COOH (benzoic acid), HOC$_6$H$_4$COOH (2—, 3—, or 4-hydroxybenzoic acid), CH$_3$CH$_2$COOH (propionic acid), CH$_3$CH$_2$CH$_2$COOH (butyric acid), CH$_3$CH(OH)CH$_2$COOH (3-hydroxybutyric acid), CH$_3$(CH$_2$)$_4$COOH (hexanoic acid), CH$_3$(CH$_2$)$_3$CH(OH)COOH (2-hydroxyhexanoic acid), CH$_3$(CH$_2$)$_6$COOH (octanoic acid), CH$_3$(CH$_2$)$_8$COOH (decanoic acid), HO(CH$_2$)$_9$COOH (10-hydroxydecanoic acid), CH$_3$(CH$_2$)$_{10}$COOH (lauric acid), HO(CH$_2$)$_{11}$COOH (12-hydroxydodecanoic acid), CH$_3$(CH$_2$)$_{14}$COOH (palmitic acid), HO(CH$_2$)$_{15}$COOH (16-hydroxyhexadecanoic acid), CH$_3$(CH$_2$)$_{16}$COOH (stearic acid), CH$_3$(CH$_2$)$_5$CH(OH)(CH$_2$)$_{10}$COOH (12-hydroxystearic acid), CH$_3$(CH$_2$)$_7$CH=CH(CH$_2$)$_7$COOH (oleic acid), ClC$_6$H$_4$COOH (2—, 3—, or 4-chlorobenzoic acid), HCl (hydrochloric acid), HBr (hydrobromic acid), HI (hydrogen iodide), HF (hydrogen fluoride), H$_2$CO$_2$ (formic acid), HNO$_3$ (nitric acid), H$_3$PO$_4$ (phosphoric acid), H$_2$CO$_3$ (carbonic acid), H$_2$SO$_4$ (sulfuric acid), HClO$_4$ (perchloric acid), HClO$_3$ (chloric acid), HClO$_2$ (chlorous acid), and HClO (hyprochloric acid).

It is preferred for purposes of this invention that from 0.01 to 50 weight percent of Component (II) is used, and it is highly preferred that from 0.1 to 10 weight percent of Component (II) be employed.

Component (III) in this method of the invention is water. It is preferred for purposes of this invention that from 1 to 99.9 weight percent of Component (III) is used, and it is highly preferred that from 10 to 99.9 weight percent of Component (III) be employed.

In the method of this invention, Component (I) is present at 0.01 to 90 weight percent, Component (II) is present at 0.01 to 50 weight percent, and Component (III) is present at 1 to 99.9 weight percent such that the combined weight percent of components (I)+(II)+(III) is 100 weight percent.

The method of this invention can further comprise adding an acid anhydride during step (I). The acid anhydride is exemplified by (CH$_3$CO)$_2$O (acetic anhydride), (C$_6$H$_5$CO)$_2$O (benzoic anhydride), CH$_3$CH$_2$COOCOCH$_2$CH$_3$ (proprionic anhydride), (CH$_3$CH$_2$CH$_2$CO)$_2$O (butyric anhydride), (CH$_3$(CH$_2$)$_4$CO)$_2$O (hexanoic anhydride), (CH$_3$(CH$_2$)$_8$CO)$_2$O (decanoic anhydride), (CH$_3$(CH$_2$)$_{10}$CO)$_2$O (lauric anhydride), (CH$_3$(CH$_2$)$_{14}$CO)$_2$O (palmitic anhydride), (CH$_3$(CH$_2$)$_{16}$CO)$_2$O (stearic anhydride).

It is preferred that if an acid anhydride is employed, that from 0.01 to 20 weight parts of acid anhydride is used, and it is highly preferred that from 0.01 to 10 weight parts of acid anhydride be employed per 100 weight parts of components (I)+(II)+(III).

The method of this invention can further comprise adding an aryl halide during step (I). The aryl halide is exemplified by benzyl chloride, benzyl bromide, benzyl iodide, benzyl fluoride, phenyl chloride, phenyl bromide, or phenyl fluoride.

It is preferred that if an aryl halide is employed, that from 0.01 to 10 weight parts of aryl halide is used, and it is highly preferred that from 0.01 to 5 weight parts of aryl halide be employed per 100 weight parts of components (I)+(II)+(III).

In a third embodiment, the present invention relates to a method of treating a substrate, the method comprising the step of (I) applying to a substrate a water soluble ammonium siloxane composition wherein the water soluble ammonium siloxane composition comprises the water soluble ammonium siloxane composition described in the first embodiment of this invention hereinabove including preferred embodiments and amounts thereof.

The water soluble ammonium siloxane compositions of this invention may be applied to the substrate by employing any suitable application technique, for example by padding or spraying, or from a bath. For purposes of this invention, the compositions are applied neat (i.e. 100 wt % water soluble ammonium siloxane solution) or are further diluted in water prior to application to the substrate. The concentration of the treating solution will depend on the desired level of application of siloxane to the substrate, and on the method of application employed, but it is believed by the inventors herein that the most effective amount of the composition should be in the range such that the substrate picks up the silicone composition at about 0.05% to 10% based on the weight of the substrate.

In this method of the invention the substrate is preferably a fiber or fabric. The fibers usually in the form of tow, or knitted or woven fabrics, are immersed in a neat or a water diluted solution of the water soluble ammonium siloxane composition whereby the composition becomes selectively deposited on the fibers. The deposition of the ammonium siloxane composition on the fibers may also be expedited by increasing the temperatures of the bath with temperatures in the range of from 20° to 60° C. being generally preferred.

The compositions of this invention can be employed for the treatment of substrates such as animal fibers such as wool, cellulosic fibers such as cotton, and synthetic fibers such as nylon, polyester and acrylic fibers, or blends of these materials, for example, polyester/cotton blends, and may also be used in the treatment of leather, paper, paper pulp, tissues such as bath tissue or facial tissue, and gypsum board. The fibers may be treated in any form, for example as knitted and woven fabrics and as piece goods. They may also be treated as agglomerations of random fibers as in filling materials for pillows and the like such as fiberfil. The compositions of the invention are especially useful for treating paper pulp and bath or facial tissue.

In this embodiment of the invention the method can further comprise heating the substrate after step (I). Thus following the application of the water soluble ammonium siloxane composition to the substrate, the siloxane can then be cured. Preferably curing is expedited by exposing the treated fibers to elevated temperatures, preferably from 50° to 200° C.

The water soluble ammonium siloxane composition of this invention should be used at about 0.05 to 25 weight percent in the final bath for exhaust method applications, and about 5 gm/l to 80 gm/l in a padding method of application, and about 5 gm/l to 600 gm/l for a spraying application. The fibers or fabrics treated with the compositions of this invention have superior slickness, have no oily feeling, and are soft to the touch.

EXAMPLES 1–10

The following compositions of the present invention were prepared by mixing an aminosiloxane solution described below, an acid, and water into a container. This mixture was then agitated until the mixture was homogenous. In examples 1 and 2, the acid and aminosiloxane solution were mixed first, and this was then followed by the addition of water.

In Example 5, the solution was prepared by mixing 150.2 (g) of the aminosiloxane solution described below and 150.35 (g) of isopropyl alcohol in a 2000 ml flask. Next, with stirring, about 41.80 (g) of benzyl chloride was added with a dropper and the resulting mixture was again stirred. The mixture was then heated to a temperature of about 85° C. and then allowed to cool. After cooling, the solution was placed in an evaporating dish in the hood to remove most of the isopropyl alcohol. The remaining isopropyl alcohol was removed by heating the solution in a beaker. The resulting polymer was then mixed with water and acid. The Example 9 solution was prepared according to the same procedure as was used for Example 5, except that 150.33 (g) of aminosiloxane solution, 153.03 of isopropyl alcohol, and 59.73 (g) of benzyl chloride were used. The amount of aminosiloxane solution, acid, and water for all the examples is delineated in Table 1 hereinbelow.

Each of the aminosiloxane solutions contained (i) a mixture of an aminofunctional siloxane having the average formula $Me_3SiO(Me_2SiO)_x(MeRSiO)_ySiMe_3$, an aminofunctional siloxane having the average formula $Me_3SiO(Me_2SiO)_x(MeRSiO)_ySiMe_2OH$, an aminofunctional siloxane having the average formula $HOMe_2SiO(Me_2SiO)_x(MeRSiO)_ySiMe_2OH$, (ii) a cyclic aminofunctional siloxane having the average formula

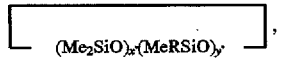

and (iii) a cyclosiloxane having the average formula

where R is a group having the formula $-CH_2CR^1HCH_2-NH-CH_2CH_2-NH_2$ where $R^1$ is methyl or a hydrogen atom, the value of x'+y' is from 4 to 9, and n has an average value of 4 to 9. The amount of each component in each solution was as follows: Example 1 contained 79 weight percent of (i), 13 weight percent of (ii), and 8 weight percent of (iii), Example 2 contained 78 weight percent of (i), 15 weight percent of (ii), and 7 weight percent of (iii), Examples 3–5, contained 73 weight percent of (i), 20 weight percent of (ii), and 7 weight percent of (iii), and Examples 6–9 contained 44 weight percent of (i), 51 weight percent of (ii), 5 weight percent of (iii) and Example 10 contained 45 weight percent of (i), 52 weight percent of (ii), 3 weight percent of (iii). The value of x and y, the acid employed in the particular example, and the identity of $R^1$ are delineated in Table 1 hereinbelow.

TABLE 1

| Ex. | x | y | $R^1$ | Acid | Wt % Siloxane | Wt % Acid | Wt % Water |
|---|---|---|---|---|---|---|---|
| 1 | 47 | 8 | —H | $CH_3COOH$ | 0.7918 | 0.2068 | 99.0014 |
| 2 | 44 | 9 | —$CH_3$ | $CH_3COOH$ | 2.3971 | 0.5991 | 97.0038 |
| 3 | 35 | 10 | —H | $CH_3COOH$ | 13.0259 | 3.2994 | 83.6747 |
| 4 | 35 | 10 | —H | $HOCH_2COOH$ | 13.3802 | 4.1462 | 82.4736 |
| 5 | 35 | 10 | —H | $CH_3COOH$ | 1.6248 | 0.3847 | 97.9905 |
| 6 | 23 | 13 | —H | $CH_3COOH$ | 59.0998 | 20.4340 | 20.4662 |
| 7 | 23 | 13 | —$CH_3$ | $CH_3COOH$ | 58.6525 | 21.3436 | 20.0039 |
| 8 | 23 | 13 | —H | $HOCH_2COOH$ | 41.2080 | 17.3892 | 41.4028 |
| 9 | 23 | 13 | —$CH_3$ | $CH_3COOH$ | 74.1808 | 15.6196 | 10.1996 |
| 10 | 11 | 15 | —$CH_3$ | $CH_3COOH$ | 60.7800 | 29.4800 | 9.7400 |

The resulting solutions (examples) contained components (i), (ii), and (iii) in the amounts delineated above however, R was a group having the formula $-CH_2CR^1HCH_2-^+NHR^2-CH_2CH_2-^+NH_2R^2.2A^-$ where $R^1$ is methyl or a hydrogen atom and $R^2$ is a hydrogen atom or a $-CH_2C_6H_5$ group. The value of x, y, x', and y' for the solutions remained the same. The identity of A, the identity of $R^1$, the identity of $R^2$, the mole percent of MeRSiO, and the neutralized polymer solubility (weight percent aminofunctional siloxane in $H_2O$) are delineated in Table 2 hereinbelow. The mole percent of MeRSiO was determined using the following formula: Mole percent MeRSiO=100(y/x+y+2). The samples were visually observed after completion of the mixing of the above components. If the sample was clear this indicated that the polymer was water soluble. Examples 1–10 were all determined to be water soluble.

TABLE 2

| Example | $R^1$ | $R^2$ | A | MeRSiO Mole (%) | Polymer Solubility (wt % in $H_2O$) |
|---|---|---|---|---|---|
| 1 | —H | —H | $CH_3COO^-$ | 14 | 1 |
| 2 | —$CH_3$ | —H | $CH_3COO^-$ | 16 | 3 |
| 3 | —H | —H | $CH_3COO^-$ | 20 | 16 |
| 4 | —H | —H | $HOCH_2COO^-$ | 20 | 17 |
| 5 | —H | —$CH_2C_6H_5$ | $Cl^-$ | 20 | 2 |
| 6 | —H | —H | $CH_3COO^-$ | 32 | 80 |
| 7 | —$CH_3$ | —H | $CH_3COO^-$ | 32 | 80 |
| 8 | —H | —H | $HOCH_2COO^-$ | 32 | 58 |
| 9 | —$CH_3$ | —$CH_2C_6H_5$ | $Cl^-$ | 32 | 90 |
| 10 | —$CH_3$ | —H | $CH_3COO^-$ | 50 | 90 |

Comparison Examples 1–8

The following compounds were prepared by mixing an aminofunctional siloxane polymer described below, an acid, and water into a container. In Comparison Example 3 the solution was prepared by mixing 350.10 (g) of the aminofunctional siloxane polymer described below and 150.05 (g) of isopropyl alcohol in a 2000 ml flask. Next, with stirring, about 11.70 (g) of benzyl chloride was added with a dropper and the resulting mixture was again stirred. The mixture was then heated to a temperature of about 85° C. and then allowed to cool. After cooling, the solution was placed in an evaporating dish in the hood to remove most of the isopropyl alcohol. The remaining isopropyl alcohol was removed by heating the solution in a beaker. The resulting solution was then mixed with water and acid. Examples 7 and 8 were prepared according to the procedure of Example 3, except that 150.01 (g) of aminosiloxane, 151.51 (g) of isopropyl alcohol, and 18.78 (g) of benzyl chloride were used. The amount of aminofunctional siloxane polymer, acid, and water for Comparison Examples 1–8 is delineated in Table 3 hereinbelow.

The aminofunctional siloxane polymer in Comparison Examples 1–8 was a compound having the average formula $Me_3SiO(Me_2SiO)_x(MeRSiO)_ySiMe_3$ where R is a group having the formula $-CH_2CH_2CH_2-NH-CH_2CH_2-NH_2$. The value of x and y, and the acid employed in the particular example are delineated in Table 3 hereinbelow.

TABLE 3

| Comparison Example | x | y | Acid | Wt % Polymer | Wt % Acid | Wt % Water |
|---|---|---|---|---|---|---|
| 1 | 208 | 4 | CH₃COOH | 0.0096 | 0.0003 | 99.9900 |
| 2 | 208 | 4 | HOCH₂COOH | 0.0099 | 0.0052 | 99.9849 |
| 3 | 208 | 4 | CH₃COOH | 0.0097 | 0.0003 | 99.9900 |
| 4 | 127 | 7 | CH₃COOH | 0.0112 | 0.0014 | 99.9874 |
| 5 | 70 | 6 | CH₃COOH | 0.0091 | 0.0009 | 99.9900 |
| 6 | 70 | 6 | HOCH₂COOH | 0.0088 | 0.0064 | 99.9848 |
| 7 | 70 | 6 | CH₃COOH | 0.0091 | 0.0009 | 99.9900 |
| 8 | 70 | 6 | HOCH₂COOH | 0.0091 | 0.0154 | 99.9755 |

The resulting compounds were aminofunctional siloxane polymers having the average formula $Me_3SiO(Me_2SiO)_x(MeRSiO)_ySiMe_3$ where R is a group having the formula $-CH_2CH_2CH_2-{}^+NHR^2-CH_2CH_2-{}^+NH_2R^2.2A^-$ where $R^2$ is a hydrogen atom or a $-CH_2C_6H_5$ group. The value of x and y for the solutions remained the same. The identity of $R^2$, the identity of A, the mole percent of MeRSiO, and the neutralized polymer solubility (weight percent aminofunctional siloxane in $H_2O$) are delineated in Table 4 hereinbelow. The mole percent of MeRSiO was determined according to the procedure described in Example 1. Comparison Examples 1–8 were all hazy or cloudy and thus determined to be water insoluble.

TABLE 4

| Comparison Example | R² | A | MeRSiO Mole (%) | Polymer Solubility (wt % in H₂O) |
|---|---|---|---|---|
| 1 | —H | CH₃COO⁻ | 2 | <0.01 |
| 2 | —H | HOCH₂COO⁻ | 2 | <0.01 |
| 3 | —CH₂C₆H₅ | Cl⁻ | 2 | <0.01 |
| 4 | —H | CH₃COO⁻ | 5 | — |
| 5 | —H | CH₃COO⁻ | 8 | 0.01 |
| 6 | —H | HOCH₂COO⁻ | 8 | <0.01 |
| 7 | —CH₂C₆H₅ | Cl⁻ | 8 | <0.01 |
| 8 | —CH₂C₆H₅ | Cl⁻ | 8 | <0.01 |

EXAMPLES 11–14

The following compositions of the present invention were prepared by mixing an aminosiloxane solution described below, an acid, and water into a container. This mixture was then agitated until the mixture was homogenous. Examples 11b, 12b, 13b, and 14b, and Comparison Examples 9b and 10b were prepared by mixing the aminosiloxane and isopropyl alcohol in a 2000 ml flask. Next, with stirring, benzyl chloride was added with a dropper and the resulting mixture was again stirred. The mixture was then heated to a temperature of about 85° C. and then allowed to cool. The amount of aminosiloxane solution or aminofunctional siloxane polymer, acid, and water for all the Comparison Examples is delineated in Table 5 hereinbelow.

Each of the aminosiloxane solutions contained (i) a mixture of an aminofunctional siloxane having the average formula $Me_3SiO(Me_2SiO)_x(MeRSiO)_ySiMe_3$, an aminofunctional siloxane having the average formula $Me_3SiO(Me_2SiO)_x(MeRSiO)_ySiMe_2OH$, an aminofunctional siloxane having the average formula $HOMe_2SiO(Me_2SiO)_x(MeRSiO)_ySiMe_2OH$, (ii) a cyclic aminofunctional siloxane having the average formula

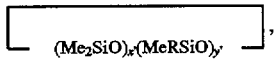

and (iii) a cyclosiloxane having the formula

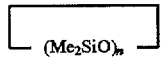

where R is a group having the formula $-CH_2CR^1HCH_2-NH-CH_2CH_2-NH_2$ where $R^1$ is methyl or a hydrogen atom, the value of x'+y' is from 4 to 9, and n has an average value of 4 to 9. The amount of each component in each solution was as follows: Examples 11a, 11c, and 11d contained 79 weight percent of (i), 13 weight percent of (ii), and 8 weight percent of (iii). Example 11b contained 81 weight percent of (i), 11 weight percent of (ii), and 8 weight percent of (iii). Examples 12a, 12c, and 12d contained 78 weight percent of (i), 15 weight percent of (ii), and 7 weight percent of (iii). Example 12b contained 77 weight percent of (i), 15 weight percent of (ii), and 8 weight percent of (iii). Examples 13a–13d contained 73 weight percent of (i), 20 weight percent of (ii), and 7 weight percent of (iii), and Examples 14a–14d contained 44 weight percent of (i), 51 weight percent of (ii), and 5 weight percent of (iii). The value of x and y, the acid employed in the particular example, and the identity of $R^1$ are delineated in Table 5 hereinbelow.

The aminofunctional siloxanes employed in the Comparison Examples had the average formula $Me_3SiO(Me_2SiO)_x(MeRSiO)_ySiMe_3$ where R is a group having the formula $-CH_2CR^1HCH_2-NH-CH_2CH_2-NH_2$ where $R^1$ is methyl or a hydrogen atom.

TABLE 5

| Ex. | x | y | R¹ | Acid | Wt % Polymer | Wt % Acid | Wt % Water |
|---|---|---|---|---|---|---|---|
| 11a | 47 | 8 | —H | CH₃COOH | 0.7918 | 0.2068 | 99.0014 |

TABLE 5-continued

| Ex. | x | y | R¹ | Acid | Wt % Polymer | Wt % Acid | Wt % Water |
|---|---|---|---|---|---|---|---|
| 11b | 47 | 8 | —H | $CH_3COOH$ | 0.0869 | 0.0129 | 99.9002 |
| 11c | 47 | 8 | —H | $HOCH_2COOH$ | 0.8079 | 0.1957 | 98.9964 |
| 11d | 47 | 8 | —H | $HOC_6H_4COOH$ | 0.6857 | 0.3138 | 99.0006 |
| 12a | 44 | 9 | —$CH_3$ | $CH_3COOH$ | 2.3971 | 0.5991 | 97.0038 |
| 12b | 44 | 9 | —$CH_3$ | $CH_3COOH$ | 0.2162 | 0.0331 | 99.7508 |
| 12c | 44 | 9 | —$CH_3$ | $HOCH_2COOH$ | 1.1788 | 0.3212 | 98.5000 |
| 12d | 44 | 9 | —$CH_3$ | $HOC_6H_4COOH$ | 0.9985 | 0.4929 | 98.5086 |
| 13a | 35 | 10 | —H | $CH_3COOH$ | 13.0259 | 3.2994 | 83.6747 |
| 13b | 35 | 10 | —H | $CH_3COOH$ | 1.6248 | 0.3847 | 97.9905 |
| 13c | 35 | 10 | —H | $HOCH_2COOH$ | 13.3802 | 4.1462 | 82.4736 |
| 13d | 35 | 10 | —H | $HOC_6H_4COOH$ | 11.7526 | 7.1993 | 81.0481 |
| 14a | 23 | 13 | —H | $CH_3COOH$ | 59.0998 | 20.4340 | 20.4662 |
| 14b | 23 | 13 | —H | $CH_3COOH$ | 74.1808 | 15.6196 | 10.1996 |
| 14c | 23 | 13 | —H | $HOCH_2COOH$ | 41.2080 | 17.3892 | 41.4028 |
| 14d | 23 | 13 | —H | $HOC_6H_4COOH$ | 42.6109 | 37.3015 | 20.0876 |
| Comparison Examples: | | | | | | | |
| 9a | 208 | 4 | —H | $CH_3COOH$ | 0.0096 | 0.0003 | 99.99 |
| 9b | 208 | 4 | —H | $CH_3COOH$ | 0.0097 | 0.0003 | 99.99 |
| 9c | 208 | 4 | —H | $HOCH_2COOH$ | 0.0099 | 0.0052 | 99.9849 |
| 9d | 208 | 4 | —H | $HOC_6H_4COOH$ | 0.0093 | 0.0008 | 99.9899 |
| 10a | 70 | 6 | —H | $CH_3COOH$ | 0.0091 | 0.0009 | 99.99 |
| 10b | 70 | 6 | —H | $CH_3COOH$ | 0.0093 | 0.0007 | 99.99 |
| 10c | 70 | 6 | —H | $HOCH_2COOH$ | 0.0088 | 0.0064 | 99.9848 |
| 10d | 70 | 6 | —H | $HOC_6H_4COOH$ | 0.0078 | 0.0022 | 99.99 |

The resulting solutions (examples) contained components (i), (ii), and (iii) in the amounts delineated above however, R was a group having the formula —$CH_2CR^1HCH_2$—$^+NHR^2$—$CH_2CH_2$—$^+NH_2R^2.2A^-$ where $R^1$ is methyl or a hydrogen atom and $R^2$ is a hydrogen atom or a —$CH_2C_6H_5$ group.

The resulting compounds in the comparison examples had the average formula $Me_3SiO(Me_2SiO)_x(MeRSiO)_ySiMe_3$ where R is a group having the formula —$CH_2CR^1HCH_2$—$^+NHR^2$—$CH_2CH_2$—$^+NH_2R^2.2A^-$ where $R^1$ is methyl or a hydrogen atom and $R^2$ is a hydrogen atom or a —$CH_2C_6H_5$ group. The value of x, y, x', and y' for the solutions and comparative compounds remained the same. The identity of A, the identity of $R^1$, the identity of $R^2$, the mole percent of MeRSiO, and the neutralized polymer solubility (weight percent aminofunctional siloxane in $H_2O$) are delineated in Table 6 hereinbelow. The mole percent of MeRSiO was determined according to the procedure of Example 1. Examples 11a–14d were all determined to be water soluble since all of the solutions were clear upon visual inspection.

TABLE 6

| Ex. | R¹ | R² | A | MeRSiO Mole (%) | Polymer Solubility (wt % in $H_2O$) |
|---|---|---|---|---|---|
| 11a | —H | —H | $CH_3COO^-$ | 14 | 1 |
| 11b | —H | —$CH_2C_6H_5$ | $Cl^-$ | 13 | 0.1 |
| 11c | —H | —H | $HOCH_2COO^-$ | 14 | 1 |
| 11d | —H | —H | $HOC_6H_4COO^-$ | 14 | 1 |
| 12a | —$CH_3$ | —H | $CH_3COO^-$ | 16 | 3 |
| 12b | —$CH_3$ | —$CH_2C_6H_5$ | $Cl^-$ | 16.5 | 0.25 |
| 12c | —$CH_3$ | —H | $HOCH_2COO^-$ | 16 | 1.5 |
| 12d | —$CH_3$ | —H | $HOC_6H_4COO^-$ | 16 | 1.5 |
| 13a | —H | —H | $CH_3COO^-$ | 20 | 16 |
| 13b | —H | —$CH_2C_6H_5$ | $Cl^-$ | 20 | 2 |
| 13c | —H | —H | $HOCH_2COO^-$ | 20 | 17.5 |
| 13d | —H | —H | $HOC_6H_4COO^-$ | 20 | 19 |
| 14a | —H | —H | $CH_3COO^-$ | 32 | 80 |
| 14b | —H | —$CH_2C_6H_5$ | $Cl^-$ | 32 | 90 |
| 14c | —H | —H | $HOCH_2COO^-$ | 32 | 58.5 |
| 14d | —H | —H | $HOC_6H_4COO^-$ | 32 | 80 |
| Comparison Examples: | | | | | |
| 9a | —H | —H | $CH_3COO^-$ | 2 | 0 |
| 9b | —H | —$CH_2C_6H_5$ | $Cl^-$ | 2 | 0 |
| 9c | —H | —H | $HOCH_2COO^-$ | 2 | 0 |
| 9d | —H | —H | $HOC_6H_4COO^-$ | 2 | 0 |
| 10a | —H | —H | $CH_3COO^-$ | 8 | 0 |
| 10b | —H | —$CH_2C_6H_5$ | $Cl^-$ | 8 | 0 |
| 10c | —H | —H | $HOCH_2COO^-$ | 8 | 0 |
| 10d | —H | —H | $HOC_6H_4COO^-$ | 8 | 0 |

EXAMPLES 15–17

The following compositions of the present invention were prepared by mixing an aminosiloxane solution described below, glacial acetic acid, and water into a container. This mixture was then agitated until the mixture was homogenous. Comparison Example 11 and 15 were prepared in the same manner as Examples 16 and 17, except that the acid and water were mixed before the water was added.

Each of the aminosiloxane solutions contained (i) a mixture of an aminofunctional siloxane having the average formula $Me_3SiO(Me_2SiO)_x(MeRSiO)_ySiMe_3$, an aminofunctional siloxane having the average formula $Me_3SiO(Me_2SiO)_x(MeRSiO)_ySiMe_2OH$, an aminofunctional siloxane having the average formula $HOMe_2SiO(Me_2SiO)_x(MeRSiO)_ySiMe_2OH$, (ii) a cyclic aminofunctional siloxane having the average formula

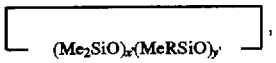

and (iii) a cyclosiloxane having the formula

where R is a group having the formula where R is a group having the formula —$CH_2CH_2CH_2NH_2$, the value of x'+y' is from 4 to 9, and n has an average value of 4 to 9. The amount of each component in each solution was as follows: Example 15 contained 85 weight percent of (i), 5 weight percent of (ii), and 10 weight percent of (iii), Example 16 contained 86 weight percent of (i), 8 weight percent of (ii), and 6 weight percent of (iii), and Example 17 contained 77 weight percent of (i), 18 weight percent of (ii), and 5 weight percent of (iii).

The aminofunctional siloxane polymer employed in Comparison Example 11 had the average formula $Me_3SiO(Me_2SiO)_x(MeRSiO)_ySiMe_3$ where R is a group having the formula —$CH_2CH_2CH_2$—$NH_2$.

The weight percent of siloxane solution, acid, and water were as follows:

TABLE 7

| Ex. | x | y | Wt % Siloxane Solution | Wt % Acid | Wt % Water |
|---|---|---|---|---|---|
| 15 | 81 | 23 | 0.6067 | 0.0884 | 99.3049 |
| 16 | 27 | 16 | 8.1081 | 1.8919 | 90 |
| 17 | 28 | 40 | 67.9198 | 21.5539 | 10.5273 |
| Compar. Ex. | | | | | |
| 11 | 323 | 7 | 0.0098 | 0.0002 | 99.99 |

The resulting solutions (examples) contained components (i), (ii), and (iii) in the amounts delineated above however, R was a group having the formula —$CH_2CH_2CH_2$—$^+NH_3.CH_3COO^-$.

The resulting compound in the Comparison Example had the average formula: $Me_3SiO(Me_2SiO)_x(MeRSiO)_ySiMe_3$ where R was a group having the formula —$CH_2CH_2CH_2$—$^+NH_3.CH_3COO^-$. The value of x, y, x', and y' for the solutions and comparative compounds remained the same. The mole percent of MeRSiO, and the neutralized polymer solubility (weight percent aminofunctional siloxane in $H_2O$) for the Examples and Comparison Example are delineated in Table 8 hereinbelow. The mole percent of MeRSiO was calculated as described in Example 1. Examples 15–17 were both determined to be water soluble since all of the solutions were clear upon visual inspection.

TABLE 8

| Example | MeRSiO Mole (%) | Polymer Solubility (wt % in $H_2O$) |
|---|---|---|
| 15 | 20 | 0.07 |
| 16 | 32 | 10.00 |
| 17 | 50 | 89.50 |
| Compar. Ex. | | |
| 11 | 2 | 0 |

EXAMPLE 18

A composition of the invention was prepared by adding 7.55 (g) of an aminosiloxane solution containing (i) 44 weight percent of a mixture of an aminofunctional siloxane having the average formula $Me_3SiO(Me_2SiO)_{23}(MeRSiO)_{13}SiMe_3$, an aminofunctional siloxane having the average formula $Me_3SiO(Me_2SiO)_{23}(MeRSiO)_{13}SiMe_2OH$, and an aminofunctional siloxane having the average formula $HOMe_2SiO(Me_2SiO)_{23}(MeRSiO)_{13}SiMe_2OH$, (ii) 51 weight percent of an aminofunctional siloxane having the average formula

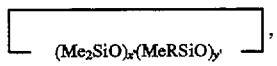

and (iii) 5 weight percent of a cyclosiloxane having the average formula

where R is a group having the formula —$CH_2C(CH_3)HCH_2$—NH—$CH_2CH_2$—$NH_2$, the value of x'+y' is from 4 to 9, and n has an average value of 4 to 9, and 1.94 (g) of acetic anhydride to a container. The mixture was stirred and then allowed to react. The resulting solution (example) contained components (i), (ii), and (iii) in the amounts delineated above however, R was a group having the formula —$CH_2CH_2CH_2$—$^+NH_2$—$CH_2CH_2$—$NHR^1.CH_3COO^-$ where $R^1$ is —$C(O)CH_3$. The neutralized polymer solubility (weight percent aminofunctional siloxane in $H_2O$) was 70% by weight in water.

EXAMPLES 19–24

A composition of the present invention was prepared by mixing about 33 weight percent of an aminosiloxane solution and 3.0 weight percent of glacial acetic acid in a container under nitrogen. Next, about 64 weight percent of water was added to this mixture and the mixture was then agitated until it was homogenous.

The aminosiloxane solution contained about (i) 44 weight percent of a mixture of an aminofunctional siloxane having the average formula $Me_3SiO(Me_2SiO)_{23}(MeRSiO)_{13}SiMe_3$, an aminofunctional siloxane having the average formula $Me_3SiO(Me_2SiO)_{23}(MeRSiO)_{13}SiMe_2OH$, and an aminofunctional siloxane having the average formula $HOMe_2SiO(Me_2SiO)_{23}(MeRSiO)_{13}SiMe_2OH$, (ii) 51 weight percent of an aminofunctional siloxane having the average formula

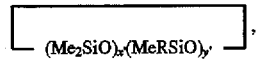

and (iii) 5 weight percent of a cyclosiloxane having the formula

where R is a group having the formula —$CH_2CH(CH_3)CH_2$—NH—$CH_2CH_2$—$NH_2$, the value of x'+y' is from 4 to 9, and n has an average value of 4 to 9. The resulting solution (example) contained components (i), (ii), and (iii) in the amounts delineated above however, R was a group having the formula —$CH_2CH(CH_3)CH_2$—$^+NH_2$—$CH_2CH_2$—$^+NH_3.2CH_3COO^-$. Next, an amount of this solution was mixed with water. The amount of solution and water for each example is shown in Table 9 hereinbelow.

TABLE 9

| Example | Wt % Solution | Wt % Water |
|---|---|---|
| 19 | 0.1 | 99.9 |
| 20 | 1.0 | 99.0 |
| 21 | 5.0 | 95.0 |
| 22 | 10.0 | 90.0 |
| 23 | 25.0 | 75.0 |
| 24 | 50.0 | 50.0 |
| Blank | 0.0 | 100.0 |

These examples were then tested for weight percent pick-up, relative hand value, were observed for feel, and were observed for the amount of yellowing detected on the fabric the sample was placed on and the results of these tests are delineated in Table 10 hereinbelow. The weight percent pick up is the percent weight gain by the fabric during treatment. For example, if a 5 gram fabric contains 2.5 grams during treatment, the pick up is 50 percent. The relative hand value was determined by a survey of panelists. The panelists first rank treated samples in order of increasing softness. This ranking is then repeated a number of times to insure reproducibility. Samples are then given ratings based on comparisons to the controls and each other. The rating scale is between 1 and 5 in increments of 0.25, with the higher ratings indicating increased softness. A rating difference of 0.25 between samples indicates that the panelists could consistently detect a difference in the softness after handling the samples for a period of about 15 seconds. When two samples were 0.50 points apart, panelists could perceive a difference in around 5 seconds, while a difference of 0.75 or higher indicated an immediately noticeable distinction. The amount of yellowing is determined visually and the degree to which the fabric appears to be yellow is recorded. The sample was placed on the fabric by soaking a 12.5 inch by 10 inch 100% cotton sheet in the solution in a 400 g bath. The sheet was removed, run through a padder to dry and placed in a 150° C. oven for 3.5 minutes to dry. The sheet was then tested for weight percent pick-up, hand value, feel, and yellowing as described above. The results of the test are reported in Table 10 hereinbelow.

TABLE 10

| Example | Wt % Pick-up | Relative Hand Value (5 = best) | Feel | Yellowing |
|---|---|---|---|---|
| 19 | −2.9* | 0.5 | Rough | low |
| 20 | 2.1 | 1 | Rough | low |
| 21 | 1.6 | 2 | Soft Smooth | low |
| 22 | 3.2 | 4 | Soft Smooth | yellow |
| 23 | 7.1 | 4 | Very Smooth Soft | yellow |
| 24 | 15.5 | 3 | Smooth Rigid | yellow |
| Blank | 0 | 0 | Rough | none |

*The sample had a negative pickup due to the heating in the process of padding and curing which caused the untreated fabric to become dehydrated and lose some mass.

It is apparent from Table 10 that the compounds of the present invention render fibers smooth and soft and are thus useful as fiber treatment agents.

That which is claimed is:

1. A water soluble ammonium siloxane composition comprising:

(A) 0.01 to 90 weight percent of an aminosiloxane blend comprising a mixture of:
  (i) an aminofunctional siloxane having its formula selected from the group consisting of:
    (a) $R_3SiO(Me_2SiO)_x(RR^1SiO)_y(RR^2SiO)_zSiR_3$ and
    (b) $R_3SiO(Me_2SiO)_x(RR^1SiO)_ySiR_3$; and
  (ii) an aminofunctional siloxane having its formula selected from the group consisting of:
    (a) $R_3SiO(Me_2SiO)_x(RR^1SiO)_y(RR^2SiO)_zSiR_2OH$ and
    (b) $R_3SiO(Me_2SiO)_x(RR^1SiO)_ySiR_2OH$; and
  (iii) an aminofunctional siloxane having its formula selected from the group consisting of:
    (a) $HOR_2SiO(Me_2SiO)_x(RR^1SiO)_y(RR^2SiO)_zSiR_2OH$ and
    (b) $HOR_2SiO(Me_2SiO)_x(RR^1SiO)_ySiR_2OH$;

(B) 0.1 to 90 weight percent of a cyclic aminofunctional siloxane having the average formula:

$$[(Me_2SiO)_{x'}(RR^1SiO)_{y'}] \quad (i)$$

and (C) 0.1 to 10 weight percent of a compound having the average formula:

$$[(Me_2SiO)_n] \quad (i)$$

wherein Me denotes methyl, R is independently a monovalent hydrocarbon radical having from 1 to 6 carbon atoms or an aryl radical, $R^1$ is a group having its formula selected from the group consisting of $-R^3-{}^+NHR^5-R^4-{}^+NH_2R^5.2A^-$, $-R^3-{}^+NH_2-R^4-NHR^6.A^-$, $-R^3-NR^6-R^4-{}^+NH_3.A^-$, $-R^3-{}^+NH_2R^5.A^-$, and wherein $R^3$ is a divalent hydrocarbon radical having at least 3 carbon atoms, $R^4$ is a divalent hydrocarbon radical having at least 2 carbon atoms, $R^5$ is selected from the group consisting of hydrogen, an alkyl radical having from 1 to 6 carbon atoms, an aryl radical, and an arylalkyl radical, $R^6$ is a $-C(O)R^7$ group where $R^7$ is selected from the group consisting of a monovalent hydrocarbon group having from 1 to 20 carbon atoms and an aryl radical, and $A^-$ is an anion selected from the group consisting of halide anions, carboxylate anions, and inorganic oxoanions, $R^2$ is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1.

2. A composition according to claim 1, wherein R is methyl or phenyl.

3. A composition according to claim 1, wherein $R^2$ is independently selected from the group consisting of ethyl, propyl, butyl, hexyl, phenyl, tolyl, and xylyl.

4. A composition according to claim 1, wherein $R^3$ is selected from the group consisting of propylene, butylene, pentylene, trimethylene, 2-methyltrimethylene, pentamethylene, hexamethylene, 3-ethyl-hexamethylene, and octamethylene.

5. A composition according to claim 1, wherein $R^4$ is selected from the group consisting of ethylene, propylene, butylene, pentylene, trimethylene, 2-methyltrimethylene, pentamethylene, hexamethylene, 3-ethyl-hexamethylene, and octamethylene.

6. A composition according to claim 1, wherein $R^5$ is selected from the group consisting of hydrogen, methyl, phenyl, $-COCH_3$, and $-CH_2C_6H_5$.

7. A composition according to claim 1, wherein A⁻ is selected from the group consisting of CH₃COO⁻, Cl⁻, HOCH₂COO⁻, C₆H₅COO⁻, and HOC₆H₄COO⁻.

8. A composition according to claim 1, wherein (A)(i) is an aminofunctional siloxane having the formula Me₃SiO(Me₂SiO)$_x$(MeR¹SiO)$_y$SiMe₃, (A)(ii) is an aminofunctional siloxane having the formula Me₃SiO(Me₂SiO)$_x$(MeR¹SiO)$_y$SiMe₂OH, (A)(iii) is an aminofunctional siloxane having the formula HOMe₂SiO(Me₂SiO)$_x$(MeR¹SiO)$_y$SiMe₂OH, and (B) is a cyclic aminofunctional siloxane having the formula:

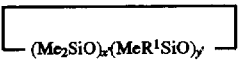

wherein R¹ is a group having its formula selected from the group consisting of:

$$-CH_2CH_2CH_2-\overset{+}{N}H_2-CH_2CH_2-\overset{+}{N}H_3 \cdot 2A^-,$$

$$-CH_2CH(CH_3)CH_2-\overset{+}{N}H_2-CH_2CH_2-\overset{+}{N}H_3 \cdot 2A^-,$$

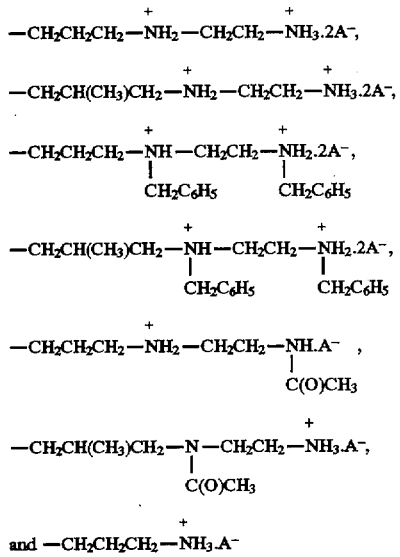

$$\text{and } -CH_2CH_2CH_2-\overset{+}{N}H_3 \cdot A^-$$

wherein A⁻ is selected from the group consisting of CH₃COO⁻, Cl⁻, HOCH₂COO⁻, C₆H₅COO⁻, and HOC₆H₄COO⁻ wherein x, y, x', and y' are as defined above.

9. A composition according to claim 1, wherein x has a value of 10 to 100, y has a value of 5 to 50, x' has a value of 2 to 3.5, and y' has a value of 0.5 to 2 with the proviso that the value of x'+y' is from 4 to 9.

10. A composition according to claim 1, wherein x has a value of 10 to 100, y has a value of 5 to 50, x' has a value of 2 to 3.5, and y' has a value of 0.5 to 2 with the proviso that the value of x'+y' is from 4 to 9.

11. A method of making a water soluble ammonium siloxane composition comprising mixing:

(I) a solution comprising:
(A) 0.01 to 90 weight percent of an aminosiloxane solution comprising a mixture of:
  (i) an aminofunctional siloxane having its formula selected from the group consisting of:
    (a) R₃SiO(Me₂SiO)$_x$(RR¹SiO)$_y$(RR²SiO)$_z$SiR₃ and
    (b) R₃SiO(Me₂SiO)$_x$(RR¹SiO)$_y$SiR₃; and
  (ii) an aminofunctional siloxane having its formula selected from the group consisting of:
    (a) R₃SiO(Me₂SiO)$_x$(RR¹SiO)$_y$(RR²SiO)$_z$SiR₂OH and
    (b) R₃SiO(Me₂SiO)$_x$(RR¹SiO)$_y$SiR₂OH; and
  (iii) an aminofunctional siloxane having its formula selected from the group consisting of:
    (a) HOR₂SiO(Me₂SiO)$_x$(RR¹SiO)$_y$(RR²SiO)$_z$SiR₂OH and
    (b) HOR₂SiO(Me₂SiO)$_x$(RR¹SiO)$_y$SiR₂OH;
(B) 0.1 to 90 weight percent of a cyclic aminofunctional siloxane having the average formula:

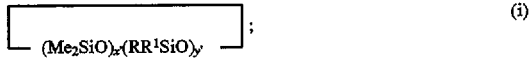

and (C) 0.1 to 10 weight percent of a compound having the average formula:

wherein Me denotes methyl, R is independently a monovalent hydrocarbon radical having from 1 to 6 carbon atoms or an aryl radical, R¹ is a group having its formula selected from the group consisting of —R³NH—R⁴—NH₂ and —R³—NH₂ wherein R³ is a divalent hydrocarbon radical having at least 3 carbon atoms, R⁴ is a divalent hydrocarbon radical having at least 2 carbon atoms, R² is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1;

(II) an acid compound; and
(III) water.

12. A method according to claim 11, wherein R is methyl or phenyl.

13. A method according to claim 11, wherein R² is independently selected from the group consisting of ethyl, propyl, butyl hexyl, phenyl, tolyl, and xylyl.

14. A method according to claim 11, wherein R³ is selected from the group consisting of propylene, butylene, pentylene, trimethylene, 2-methyltrimethylene, pentamethylene, hexamethylene, 3-ethyl-hexamethylene, and octamethylene.

15. A method according to claim 11, wherein R⁴ is selected from the group consisting of ethylene, propylene, butylene, pentylene, trimethylene, 2-methyltrimethylene, pentamethylene, hexamethylene, 3-ethyl-hexamethylene, and octamethylene.

16. A method according to claim 11, wherein (A)(i) is an aminofunctional siloxane having the formula Me₃SiO(Me₂SiO)$_x$(MeR¹SiO)$_y$SiMe₃, (A)(ii) is an aminofunctional siloxane having the formula Me₃SiO(Me₂SiO)$_x$(MeR¹SiO)$_y$SiMe₂OH, (A)(iii) is an aminofunctional siloxane having the formula HOMe₂SiO(Me₂SiO)$_x$(MeR¹SiO)$_y$SiMe₂OH, and (B) is a cyclic aminofunctional siloxane having the formula:

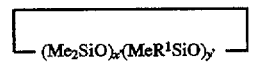

wherein R¹ is a group having its formula selected from the group consisting of —CH₂CH₂CH₂—NH—CH₂CH₂—NH₂, —CH₂CH(CH₃)CH₂—NH—CH₂CH₂—NH₂, and —CH₂CH₂CH₂—NH₂ wherein x, y, x', and y' are as defined above.

17. A method according to claim 16, wherein x has a value of 10 to 100, y has a value of 5 to 50, x' has a value of 2 to 3.5, and y' has a value of 0.5 to 2 with the proviso that the value of x'+y' is from 4 to 9.

18. A method according to claim 11, wherein x has a value of 10 to 100, y has a value of 5 to 50, x' has a value of 2 to 3.5, and y' has a value of 0.5 to 2 with the proviso that the value of x'+y' is from 4 to 9.

19. A method according to claim 11, wherein (II) is selected from the group consisting of $CH_3COOH$, $HOCH_2COOH$, $C_6H_5COOH$, $HOC_6H_4COOH$, and $(CH_3CO)_2O$.

20. A method according to claim 11, wherein the method further comprises adding an acid anhydride during step (I).

21. A method according to claim 20, wherein the acid anhydride is selected from the group consisting of acetic anhydride, benzoic anhydride, proprionic anhydride, butyric anhydride, hexanoic anhydride, decanoic anhydride, lauric anhydride, palmitic anhydride, and stearic anhydride.

22. A method according to claim 11, wherein the method further comprises adding an aryl halide during step (I).

23. A method according to claim 22, wherein the aryl halide is selected from the group consisting of benzyl chloride, benzyl bromide, benzyl iodide, benzyl fluoride, phenyl chloride, phenyl bromide, and phenyl fluoride.

24. A method of treating a substrate, the method comprising the step of:
(I) applying to a substrate a water soluble ammonium siloxane composition wherein the water soluble ammonium siloxane composition comprises:
(A) 0.01 to 90 weight percent of an aminosiloxane solution comprising a mixture of:
(i) an aminofunctional siloxane having its formula selected from the group consisting of:
(a) $R_3SiO(Me_2SiO)_x(RR^1SiO)_y(RR^2SiO)_zSiR_3$ and
(b) $R_3SiO(Me_2SiO)_x(RR^1SiO)_ySiR_3$; and
(ii) an aminofunctional siloxane having its formula selected from the group consisting of:
(a) $R_3SiO(Me_2SiO)_x(RR^1SiO)_y(RR^2SiO)_zSiR_2OH$ and
(b) $R_3SiO(Me_2SiO)_x(RR^1SiO)_ySiR_2OH$; and
(iii) an aminofunctional siloxane having its formula selected from the group consisting of:
(a) $HOR_2SiO(Me_2SiO)_x(RR^1SiO)_y(RR^2SiO)_zSiR_2OH$ and
(b) $HOR_2SiO(Me_2SiO)_x(RR^1SiO)_ySiR_2OH$;
(B) 0.1 to 90 weight percent of a cyclic aminofunctional siloxane having the average formula:

$$\boxed{(Me_2SiO)_x(RR^1SiO)_y} \quad (i)$$

and
(C) 0.1 to 10 weight percent of a compound having the average formula:

$$\boxed{(Me_2SiO)_n} \quad (i)$$

wherein Me denotes methyl, R is independently a monovalent hydrocarbon radical having from 1 to 6 carbon atoms or an aryl radical, $R^1$ is a group having its formula selected from the group consisting of $-R^3-{}^+NHR^5-R^4-{}^+NHR^5.2A^-$, $-R^3-{}^+NH_2-R^4-NHR^6.A^-$, $-R^3-NR^6-R^4-{}^+NH_3.A^-$, $-R^3-{}^+NH_2R^5.A^-$, and wherein $R^3$ is a divalent hydrocarbon radical having at least 3 carbon atoms, $R^4$ is a divalent hydrocarbon radical having at least 2 carbon atoms, $R^5$ is selected from the group consisting of hydrogen, an alkyl radical having from 1 to 6 carbon atoms, an aryl radical, and an arylalkyl radical, $R^6$ is a $-C(O)R^7$ group where $R^7$ is selected from the group consisting of a monovalent hydrocarbon group having from 1 to 20 carbon atoms and an aryl radical, and $A^-$ is an anion selected from the group consisting of halide anions, carboxylate anions, and inorganic oxoanions, $R^2$ is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1.

25. A method according to claim 24, wherein the method further comprises heating the substrate after step (I).

26. A method according to claim 24, wherein (A)(i) is an aminofunctional siloxane having the formula $Me_3SiO(Me_2SiO)_x(MeR^1SiO)_ySiMe_3$, (A)(ii) is an aminofunctional siloxane having the formula $Me_3SiO(Me_2SiO)_x(MeR^1SiO)_ySiMe_2OH$, (A)(iii) is an aminofunctional siloxane having the formula $HOMe_2SiO(Me_2SiO)_x(MeR^1SiO)_ySiMe_2OH$, and (B) is a cyclic aminofunctional siloxane having the formula:

$$\boxed{(Me_2SiO)_x(MeR^1SiO)_y}$$

wherein $R^1$ is a group having its formula selected from the group consisting of:

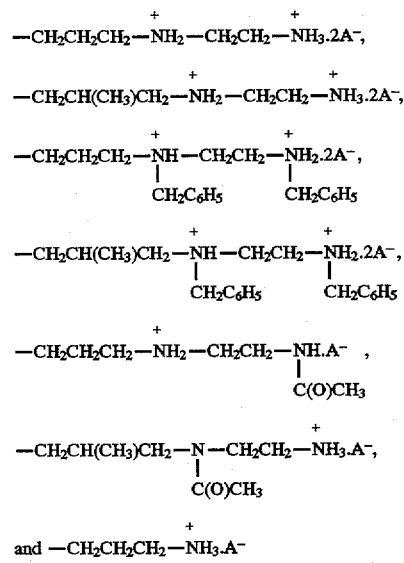

and $-CH_2CH_2CH_2-{}^+NH_3.A^-$ wherein $A^-$ is selected from the group consisting of $CH_3COO^-$, $Cl^-$, $HOCH_2COO^-$, $C_6H_5COO^-$, and $HOC_6H_4COO^-$ wherein x, y, x', and y' are as defined above.

27. A method according to claim 24, wherein x has a value of 10 to 100, y has a value of 5 to 50, x' has a value of 2 to 3.5, and y' has a value of 0.5 to 2 with the proviso that the value of x'+y' is from 4 to 9.

28. A method according to claim 24, wherein x has a value of 10 to 100, y has a value of 5 to 50, x' has a value of 2 to 3.5, and y' has a value of 0.5 to 2 with the proviso that the value of x'+y' is from 4 to 9.

29. A method according to claim 24, wherein the substrate is selected from the group consisting of wool, cotton, nylon, polyester, acrylic fibers, polyester-cotton blends, leather, paper, gypsum board, and fiberfil.

30. A composition of matter obtained by mixing the incipient ingredients:
(I) a solution comprising:

(A) 0.01 to 90 weight percent of an aminosiloxane solution comprising a mixture of:
  (i) an aminofunctional siloxane having its formula selected from the group consisting of:
    (a) $R_3SiO(Me_2SiO)_x(RR^1SiO)_y(RR^2SiO)_zSiR_3$ and
    (b) $R_3SiO(Me_2SiO)_x(RR^1SiO)_ySiR_3$; and
  (ii) an aminofunctional siloxane having its formula selected from the group consisting of:
    (a) $R_3SiO(Me_2SiO)_x(RR^1SiO)_y(RR^2SiO)_zSiR_2OH$ and
    (b) $R_3SiO(Me_2SiO)_x(RR^1SiO)_ySiR_2OH$; and
  (iii) an aminofunctional siloxane having its formula selected from the group consisting of:
    (a) $HOR_2SiO(Me_2SiO)_x(RR^1SiO)_y(RR^2SiO)_zSiR_2OH$ and
    (b) $HOR_2SiO(Me_2SiO)_x(RR^1SiO)_ySiR_2OH$;
(B) 0.1 to 90 weight percent of a cyclic aminofunctional siloxane having the average formula:

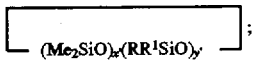 (i)

and
(C) 0.1 to 10 weight percent of a compound having the average formula:

 (i)

wherein Me denotes methyl, R is independently a monovalent hydrocarbon radical having from 1 to 6 carbon atoms or an aryl radical, $R^1$ is a group having its formula selected from the group consisting of $-R^3NH-R^4-NH_2$ and $-R^3-NH_2$ wherein $R^3$ is a divalent hydrocarbon radical having at least 3 carbon atoms, $R^4$ is a divalent hydrocarbon radical having at least 2 carbon atoms, $R^2$ is independently selected from the group consisting of a monovalent hydrocarbon radical having from 2 to 6 carbon atoms and an aryl radical, x has a value of 10 to 10,000, y has a value of 1 to 8,000, z has a value of 1 to 250, x' has an average value of 1 to 8 and y' has an average value of 1 to 8 with the proviso that the value of x'+y' is from 4 to 9, n has an average value of 4 to 9, and with the proviso that the value of y/x+y+z+2 is at least 0.1;

(II) an acid compound; and (III) water.

* * * * *